United States Patent [19]

Neumann

[11] Patent Number: 4,643,475
[45] Date of Patent: Feb. 17, 1987

[54] FLEXIBLE BULK CONTAINER

[76] Inventor: Dietmar J. Neumann, 67 Lakeshore Rd., Pointe Claire, Quebec H9S 4H5, Canada

[21] Appl. No.: 859,021

[22] Filed: May 2, 1986

Related U.S. Application Data

[62] Division of Ser. No. 637,798, Aug. 4, 1984, Pat. No. 4,606,570.

[30] Foreign Application Priority Data

Aug. 5, 1983 [GB] United Kingdom ............... 8321164

[51] Int. Cl.⁴ .............................................. B60P 3/42
[52] U.S. Cl. ................................... 296/10; 105/243; 298/24
[58] Field of Search ............... 296/10, 27, 181, 182; 105/243, 423, 359, 358; 298/24

[56] References Cited

U.S. PATENT DOCUMENTS

| | | | |
|---|---|---|---|
| 276,017 | 4/1883 | Foster | 298/24 |
| 2,768,021 | 10/1956 | Kaster | 296/10 |
| 2,807,499 | 9/1957 | Duddleston | 296/100 |
| 3,037,807 | 6/1962 | Hicks | 296/10 |
| 3,222,099 | 12/1965 | Swallert | 296/10 |
| 3,756,468 | 9/1973 | Clark et al. | 105/243 |
| 4,092,051 | 5/1978 | D'Orazio | 298/24 |
| 4,497,259 | 2/1985 | Telterton | 296/27 |

Primary Examiner—Robert R. Song

[57] ABSTRACT

A flexible bulk container is disclosed, integral with a wheeled vehicle, that has an open bulk mode and a closed flat bed mode. The container can be used one way full and the return journal empty in the flat bed mode with other cargo on the flat bed. The container comprises a main frame with two laterally spaced longitudinal members, two floor panel sections, each hinged at outside edges across the top surfaces of the longitudinal members, the two panel sections having a closed position providing a substantially flat floor, and an open position wherein the two panel sections slope upwards and outwards from each other, flexible liner attached to the two panel sections and the main frame, providing a bulk container when the two panel sections are in the open position, strut support means at the end of each of the longitudinal members to support the two panel sections in the open position, and discharge hopper means between the longitudinal members for emptying the bulk container.

20 Claims, 11 Drawing Figures

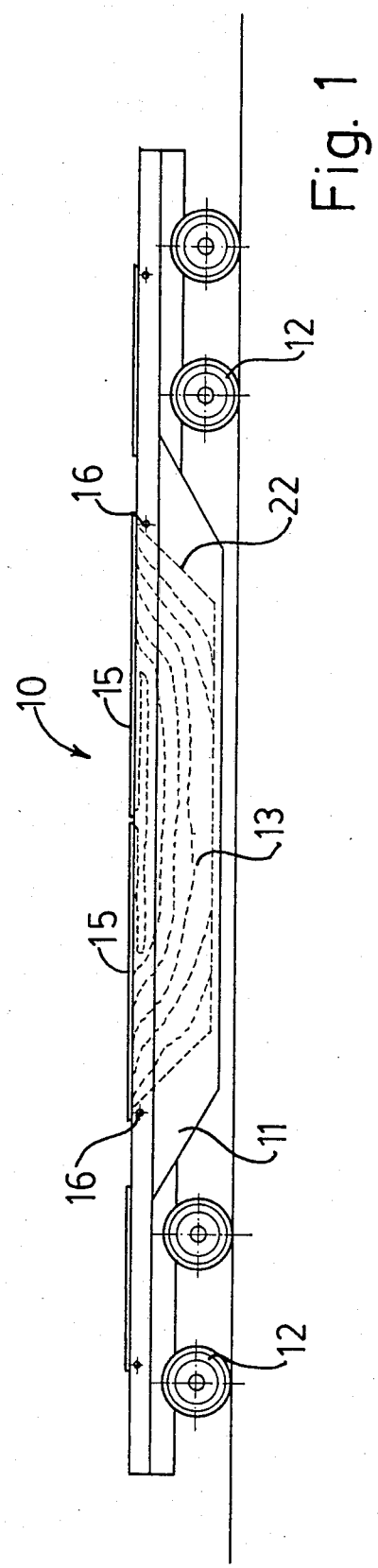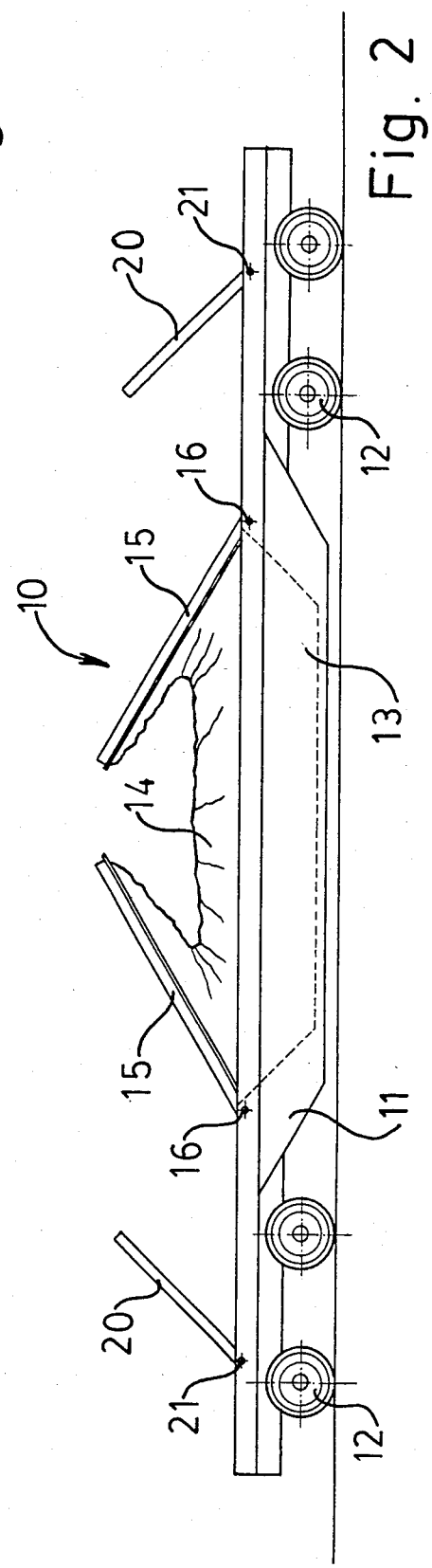

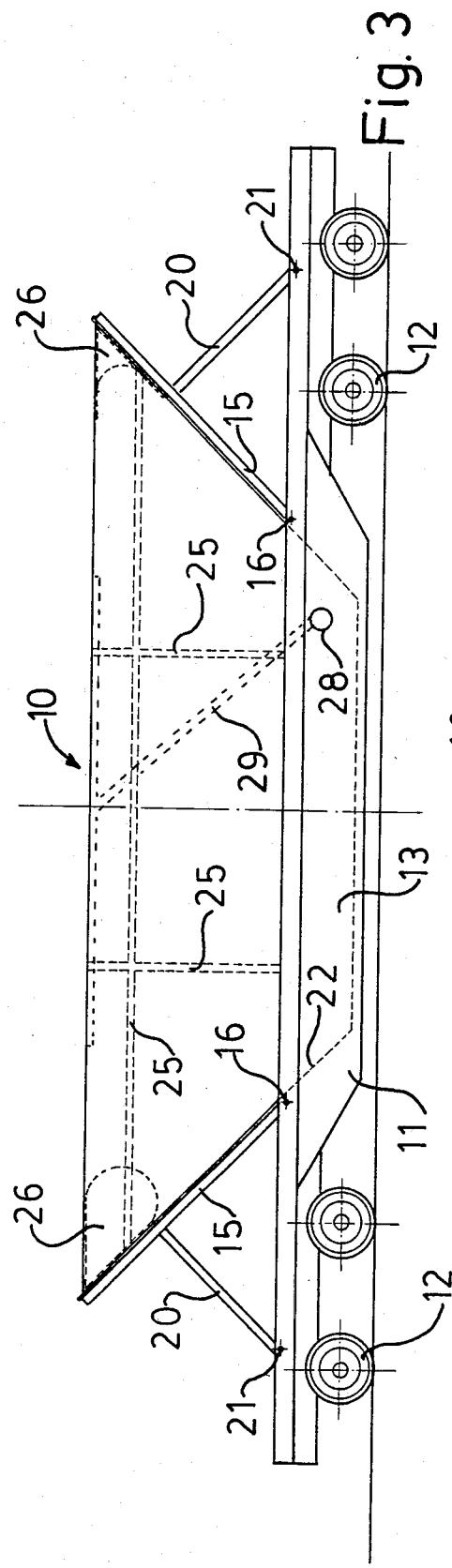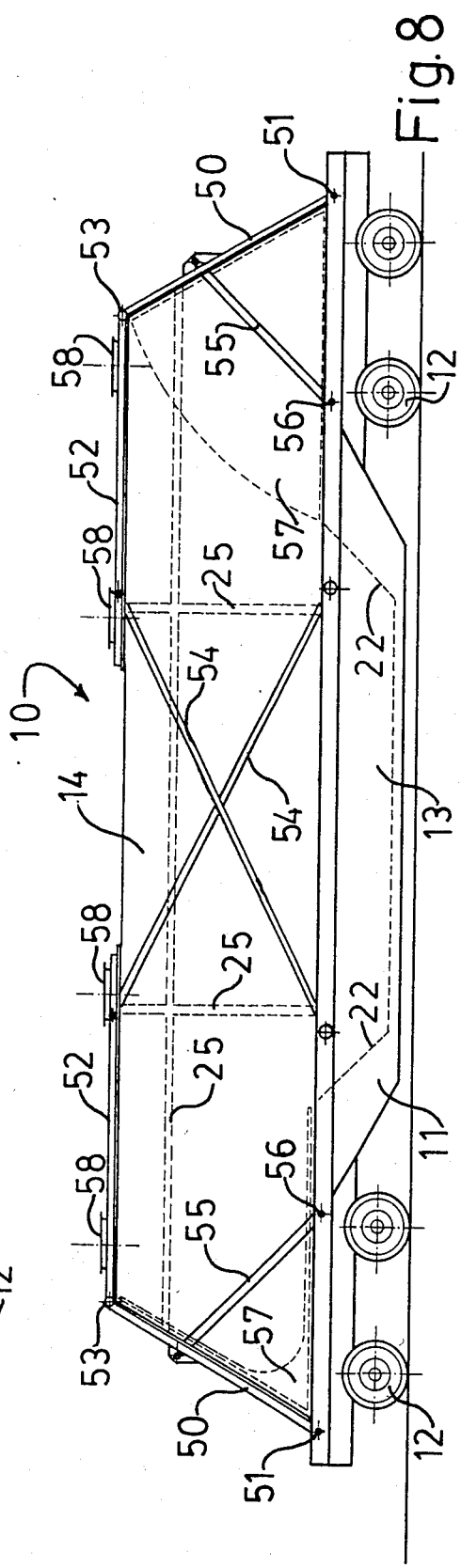

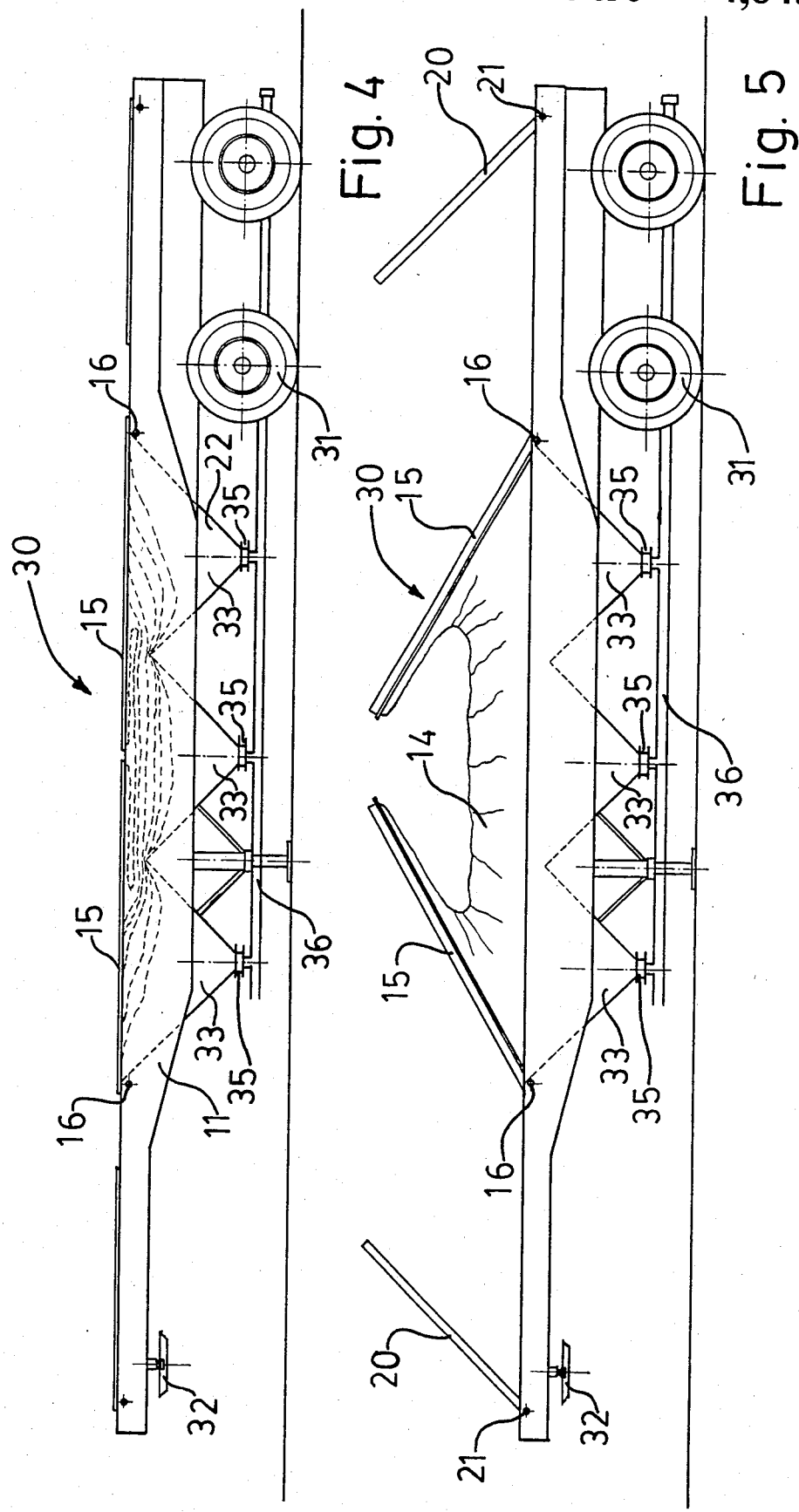

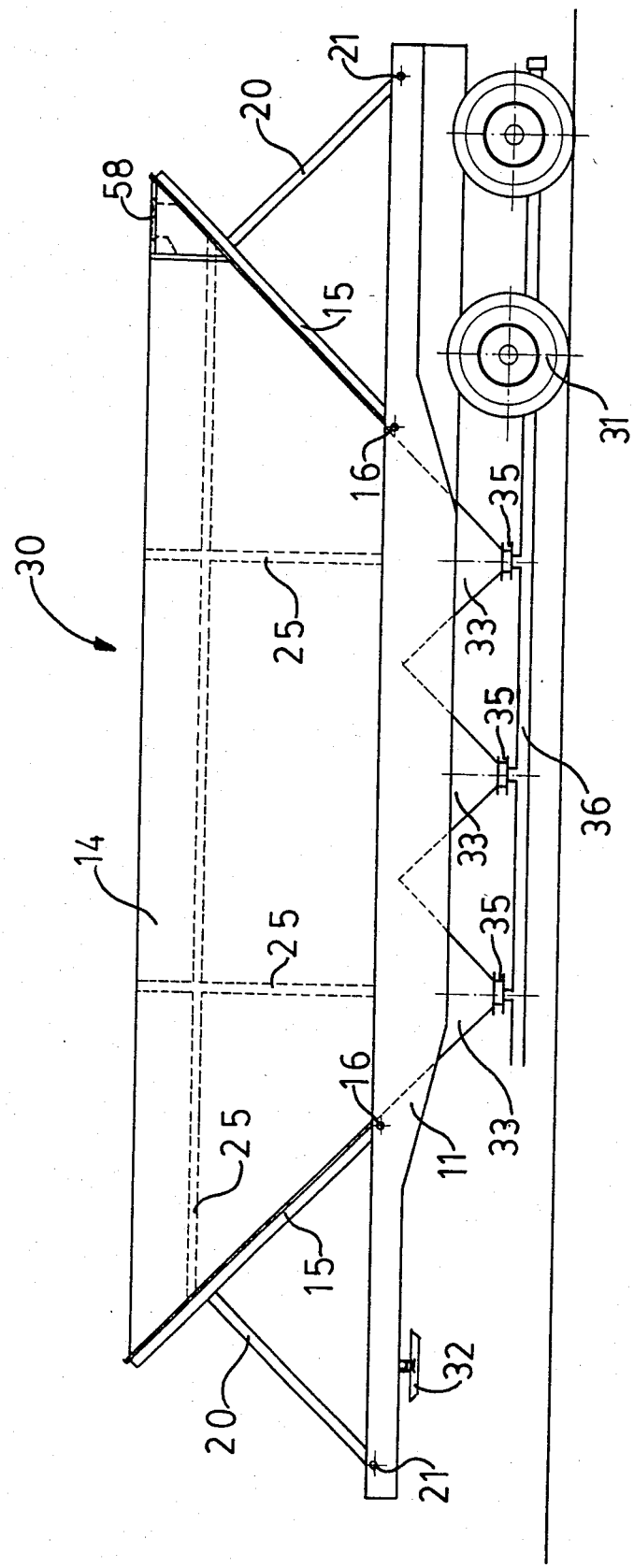

FLEXIBLE BULK CONTAINER

This is a division of application Ser. No. 637,798 filed 8/4/84, now U.S. Pat. No. 4,606,570.

The present invention relates to the transportation of bulk material. More specifically, the present invention provides a collapsible flexible bulk container integral with wheeled vehicle that can be folded flat when empty and can be utilized for carrying other elements thereon.

The transportation of most bulk materials either in solid or liquid form or mixtures thereof generally takes place in a container with fixed sides. In the case of railroads, transportation, hopper cars, box cars or tanker cars represent the most common types of vehicles used for transportation of these bulk materials. To empty a box car it is generally necessary to use manual labour to remove particulate material from the corners of the car. In the case of road vehicles, container trucks and trailers together with road tankers are types of vehicles used for shipping bulk materials. Separate containers for shipping by road, rail or sea are also used for bulk materials.

The present invention utilizes a collapsible flexible bulk container which may be retained in the open position by pressurization whilst filling the container or by built-in air ribs which are inflated to retain the container in the open position. The bulk container is provided with two folding floor panel sections which when closed provide a substantially flat floor forming a flat bed suitable for a road trailer or railcar. The floor panel sections open out and support a flexible liner which is attached to the main frame of the flat bed. Struts are provided at each end of the frame to support the floor panel sections and a discharging hopper or other discharge means is provided at the bottom of the frame for emptying the container. The flexible liner becomes part of the overall structural integrity of the wheeled vehicle when in the open position or bulk mode. The flexible liner provides a fully sealed airtight container, capable of handling a full range of dry and liquid commodities.

These flexible bulk containers, unlike the more conventional containers with fixed sides, permit ease of filling and emptying of bulk materials and when empty fold into a flat bed frame referred to as the flat bed mode, providing a low volume package. When the flexible bulk container is transported by road or rail in the flat bed mode, it has less air resistance than in the open or bulk mode.

The bulk container is integral with a wheeled vehicle and has an open or bulk mode which is collapsible to a closed or flat bed mode. The flexible material used for the liner is generally a fabric material reinforced and coated with an impregnable coating so that leakage does not occur. When empty, the liner is folded beneath the floor panels so is not exposed to the environment thus prolonging the life of the material. Furthermore, when the liner is folded away, the floor panels provide a flat surface that can be used for carrying other items, thus in the case of the railcar or a road trailer, the container may be utilized for transporting bulk materials in one direction but then the flexible liner may be stowed away and the vehicle used as a flat bed car or trailer for the return journey.

The present invention provides a hopper emptying system so that granular solids or liquids may be discharged at the base of the container. In the case of liquids, or pneumatically conveyed solid particles that can be conveyed in pipes, a pipe discharge may be used rather than a hopper discharge. However, by use of the term "discharge hopper means," throughout the specification, we mean a hopper as used for discharging granular materials and liquid materials. In all cases the container discharges by gravity or under pressure without having to use external devices such as rakes or shovels.

The present invention provides a collapsible flexible bulk container integral with a wheeled vehicle comprising: main frame with two laterally spaced longitudinal members, two floor panel sections, each hinged at outisde edges across the top surfaces of the longitudinal members, the two panel sections having a closed position providing a substantially flat floor, and an open position wherein the two panel sections slope upwards and outwards from each other, flexible liner attached to the two panel sections and the main frame, providing a bulk container when the two panel sections are in the open position, strut support means at the end of each of the longitudinal members to support the two panel sections in the open position and discharge hopper means between the longitudinal members for emptying the bulk container.

In other embodiments the bulk container may be incorporated in a railcar or a road trailer, inflatable air ribs may be incorporated with the flexible liner. The air ribs are arranged within the flexible liner such that when they are inflated, the two floor panel sections move from the closed position to the open position, and the container is ready for loading.

In other embodiments of the invention, the strut support means includes a sensing means to determine tension or compression in the strut support means and a tensioning means is incorporated with the strut support means which in cooperation with the sensing means moves the floor panel sections to keep the tension or compression in the strut support means within a predetermined range. The shape of the liner when the two panel sections are in the open position is stabilized for tension and compression by stiffening members. Support cables and stabilizing cables may be utilized to stabilize the container and the stiffening members may comprise inflatable air ribs.

At least one air bag may be provided inside and at each end of the flexible liner to fill up spare space in the container and prevent liquid slopping from one end to the other. Both air bags are pressurized and means are included to supply pressurized air to both bags so as to maintain at least one bag taking up all free space within the container. An entry pipe may also be supplied connected to the container for pneumatic filling.

There is also provided a collapsible flexible bulk container for a wheeled vehicle comprising: main frame with two laterally spaced longitudinal members, two floor panel sections, each hinged at outside edges to extremities of the main frame, the two panel sections having a closed position wherein the two panel sections are substantially flat on the main frame and an open position wherein the two panel sections slope upwards and inwards towards each other, flexible liner attached to the two panel sections and the main frame, providing a bulk container when the two panel sections are in the open position, strut support means positioned inwards one at each end of the main frame to support the two panel sections in the open position, and discharge hopper means between the longitudinal members for emptying the bulk container.

At least one air bag may be provided at each end of the main frame which when inflated provides a sloped surface to allow material in the ends of the container to be gravity discharged through the hopper means. The flexible liner may be formed from an impregnable fabric including an anti friction coating to avoid wear when the liner rubs against the frame. In some instances, the flexible liner has parts that are magnetized so that the liner holds to parts of the main frame to avoid wear from friction.

In another embodiment, the hopper means comprises a plurality of parallel equispaced apart structural members, expandable hoses fitting in spaces between the structural members, and means to expand and deflate hoses to close and open the hopper means. A vacuum closing system may be utilized wherein a vacuum is applied to the inside of the flexible liner to assist in folding the two panel sections from the open position to the closed position.

In drawings which illustrate embodiments of the invention,

FIG. 1 is a side view of a railroad car with one embodiment of the flexible bulk container of the present invention in a collapsed and folded position, FIG. 2 is a side view of the railroad car shown in FIG. 1 in a partially open or closed position, FIG. 3 is a side view of the railroad car shown in FIG. 1 in the fully open position, FIG. 4 is a side view of a road trailer with one embodiment of the flexible bulk container of the present invention in a collapsed and folded position, FIG. 5 is a side view of the road trailer shown in FIG. 4 in a partially open or closed position, FIG. 6 is a side view of the road trailer shown in FIG. 4 in the fully open position, FIG. 7 is an end cross section of the flexible bulk container shown in FIG. 3, FIG. 8 is a side view of a railroad car with another embodiment of the flexible bulk container in the fully open position, FIG. 9 is a detailed side view of one end of the railroad car shown in FIG. 8.

Figure 11:
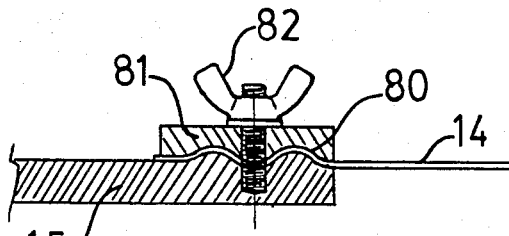
FIG. 11 is a detailed sectional view showing the connection between the liner fabric and the floor panel or main frame.

Referring now to the drawings, FIGS. 1, 2 and 3 show a railroad car 10 in the closed, partially open and fully open positions. FIG. 1 shows a flat bed car with an underslung portion 11 between a pair of wheel trucks 12. A storage and hopper compartment 13 within the underslung portion 11 or frame contains the liner 14 in a folded or collapsed state. The liner 14 is attached to the frame 11 and the two floor panel sections 15 which have hinges 16 at their external edges allowing the floor panel sections 15 to be pivoted or folded open to form the container. Struts 20 are provided at each end of the car 10 and have hinges 21 to allow them to be pivoted open to support the floor panel sections 15 when in the open position as shown in FIG. 3. As can be seen in FIG. 3, when the floor panel sections 15 are in the fully open position, they line up with tapered sides 22 of the storage compartment 13 and direct bulk material in the container to a hopper discharge.

Inflatable air ribs 25 are positioned within the liner 14 to hold the container in the fully open position when empty and ready for filling. A compressed air supply is generally available for a railcar, otherwise an external supply of compressed air can be used, particularly when loading and this compressed air supply is attached to the air ribs 25. This may be done with the container in the closed position, the compressed air then opens up the floor panel sections 15 to the open position, and opens up the liner 14 so that the container is ready for filling. Dampers are preferably provided (as described hereafter) for the floor panel sections 15 for controlled opening and closing.

The liner may be easily removed and a different liner installed in a short period of time. This allows for major repairs to be carried out on a liner, or a liner to be replaced for carrying a different commodity. For instance, one liner could be supplied for a corrosive chemical, and another for a food product. The flexible liners are designed for different uses and colour coded accordingly. Major groups of commodities include high density products such as cement, lime, etc., medium and low density products, such as chemicals, polystyrene pellets, etc. and food products such as cereals, sugar, etc.

The container volume when in the bulk mode and the number of chambers vary greatly from design to design, depending on the size of the wheeled vehicle and the commodity it is designed to carry.

A compressed air supply is required to convert a wheeled vehicle from a flat bed mode into a bulk mode by either pressurizing the flexible container internally with pressure of approximately 1 to 2 lb. sq. inch, until the two hinged floor panels 15 have reached their predetermined position, or pressurizing the built in air ribs 25.

A combination of both can be used depending on the size of the flexible container. The first approach is ideal for large units, since it is very powerful but somewhat slow when a large amount of air is required. The second approach is ideally suited for smaller units as it is fast acting and requires only a minimum quantity of air. In some applications a combination of the two methods may be used.

To revert from a bulk mode to a flat bed mode a vacuum is preferably applied to the built in flexible container, which forces the two hinged floor panels 15 closed, and makes sure that the flexible material of the liner 14 does not get caught in between any moving parts while the panels are closing.

The flexible bulk container has a number of inflatable air ribs 25 which are built into the flexible material. The air ribs 25 can either be fitted internally or externally or a combination of both. The number of air ribs vary depending on the size of the unit and the commodity it is designed to transport. The air ribs can be used for converting the wheeled vehicle from a flat bed mode to a dry bulk mode, assisting in stabilizing the flexible walls of the flexible container while loading, and providing additional stability to the flexible container when the wheeled vehicle is moving.

Air bags 26 are shown positioned in the top corners of the liner 14 when in the open position. The air bags 26 are supplied with compressed air at a predetermined pressure and can expand or contract thus allowing the container to be completely filled to stop slopping of bulk materials such as liquids during transportation. Furthermore, a pressure sensing device may be utilized to ensure that if the pressure in one bag was to suddenly drop, and the pressure in the liner 14 drop, then air would be supplied to the other bag such that it would take up the free space in the liner forcing the bulk material into the other corner and ensuring that the container remains full and slopping of liquid contents does not occur.

Whereas two air bags are illustrated here, several of them could be used. The air bags take up space when a container is less than full and redirects pressure downwards when the vehicle is moving to prevent movement backwards and forwards. An alarm can be provided if one air bag fails. The air bags can also be used to help redirect material in the container, by pressurizing the bag, a sloped surface can be found to assist in gravity discharge. Furthermore the airbags can be supplied with surges or pulses of compressed air to provide a vibrating effect to assist in discharging the material in the container.

A pneumatic loading connection 28 is shown on the side of the container, preferably on both sides with an internal loading pipe 29 feeding to the top of the container.

FIGS. 4, 5 and 6 illustrates a road trailer 30 having a bulk container therein. The road trailer 30 has wheels 31 at one end and a fifth wheel attachment 32 at the front. The flexible bulk container is a similar configuration to that shown in FIGS. 1, 2 and 3 having a liner 14 with folding floor panel sections 15. The liner 14 is attached to the floor panel sections and to the main trailer frame 30.

One type of discharge device is illustrated wherein three discharge valves 35 are connected to the underside of a triple hopper shaped compartment 33, the valves 35 feed into a central discharge pipe 36. The discharge device illustrated herein may be used for filling and discharging liquids and certain solids conveyed in pneumatic conveyors.

Figure 7:
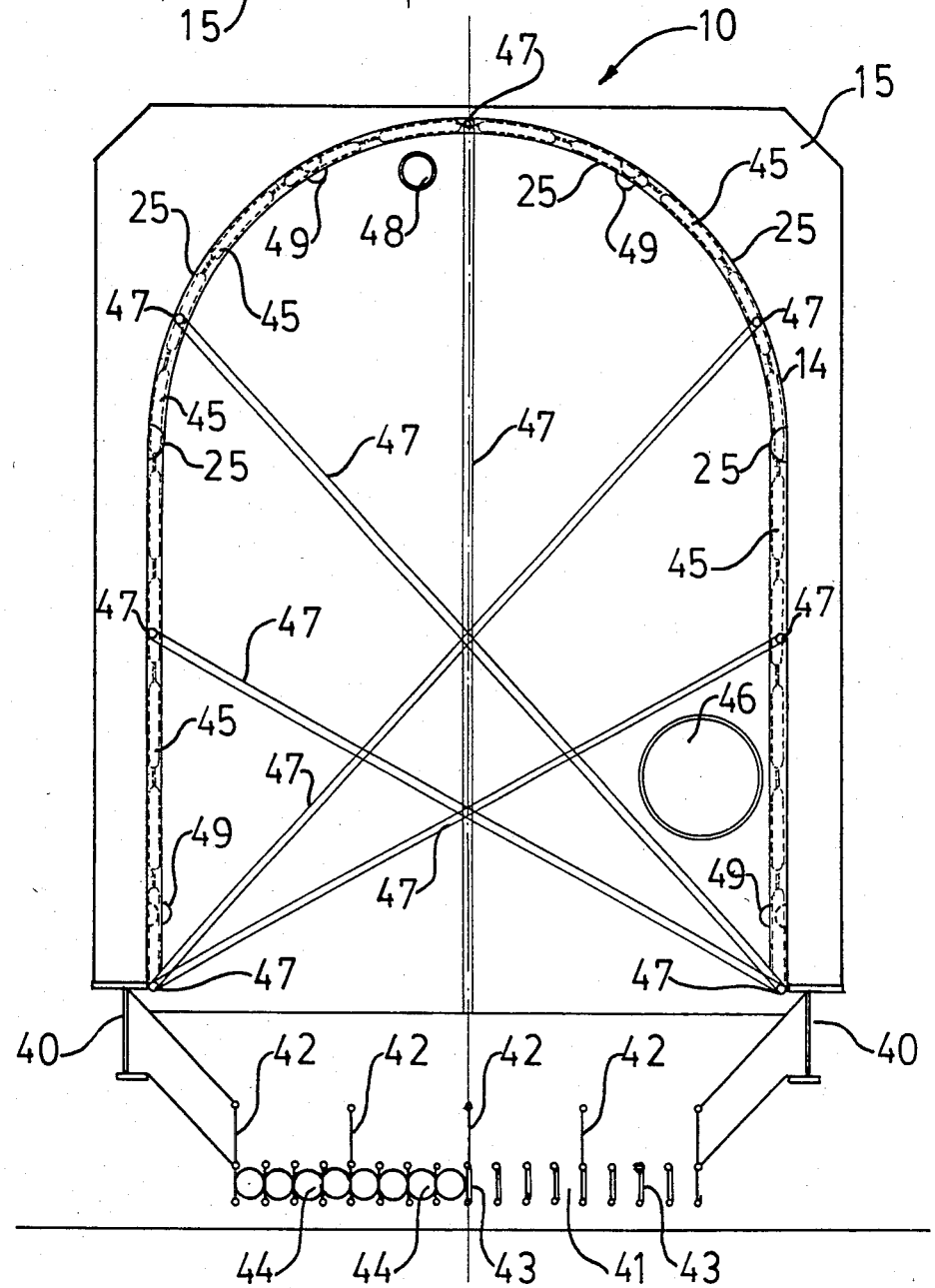

FIG. 7 illustrates a cross section of a railroad car 10 as shown in FIG. 3 with the liner in the fully open position. The main frame of the railroad car 10 has two laterally spaced longitudinal beams 40 which support a discharge hopper 41. Four structural support beams 42 extend parallel and below the longitudinal beams 40 and have a series of parallel equispaced apart intermediate beams 43 in the spaces between the four structural support beams 42. Inflatable hoses 44 are positioned in the spaces between the intermediate beams 43, and a compressed air or vacuum supply is connected to blow up or deflate the hoses 44. When the hoses 44 are inflated, they take up the spaces between the intermediate beams 43 and the discharge hopper 41 is closed. When the hoses 44 are deflated, the spaces between the intermediate beams 43 are opened and the discharge hopper allows bulk material in the container to discharge. A vacuum may be applied in some embodiments to ensure that the hoses 44 collapse completely and open up the discharge hopper 41.

Whereas one type of discharge hopper 41 is illustrated here, it will be understood that existing designs of discharge devices, some of them more conventional than that disclosed may also be utilized and built into the underneath of the frame, both for road transport vehicles and railroad cars.

As can be seen in FIG. 7, the air ribs 25 are provided inside the skin of the fabric forming the liner 14 and when compressed air is used to inflate the air ribs 25, the complete liner opens out, opening the floor panel sections 15 to the fully opened position.

The air ribs 25 have a number of tube inserts 45 in line for the length of each rib 25. These inserts 45 can be changed should a leak occur in any one of them. All the tube inserts 45 are slightly oversized and as such compensate for a failed tube insert 45 by taking up the space left by the failed insert. Thus the air ribs 25 maintain their integrity within the container since the tube inserts are under constant pressure. Each tube insert 45 is connected to the other by a non return valve thus maintaining pressure in each tube. A built in pressure sensor (not shown) ensures constant monitoring of the air ribs and maintains the proper pressure. An indicator may be provided to notify an operator or inspector when a tube insert has deflated, thus allowing for the planning of a replacement tube on the next maintenance check. A recessed inspection door 46 is shown in one of the floor panel sections 15. The ribs 25 may be located on the outside surface of the liner. The liner 14 may be stabilized for tension in the fully open position by utilizing wires or cables 47 as tension members, the cables 47 extend vertically, laterally and end to end within the liner to maintain the desired shape of the liner and ensure that it has sufficient strength to hold the bulk materials. An entry or filler pipe connection 48 is shown at the top of the container. Several filler pipes 48 may be utilized depending upon the size of the container, the type of bulk material and other factors. Cleaning hoses 49 are positioned in the container, two at the top and two at the bottom. These may be utilized for spraying water or air into the container to clean it out or even to blow up the container and pressurize it before filling.

Another embodiment of a container is shown in FIG. 8 illustrated specifically as a railroad car 10, however, it would also be suitable for use as a road trailer. This container utilizes the full length of the car inasmuch as the two floor panel sections 50 each have hinges 51 at the exterior ends of the car 10 and pivot open so that the panel sections 50 slope inwards towards the centre of the car 10 when in the fully open position rather than outwards as in the case of the previously illustrated embodiments. Top panels 52 have a hinge connection 53 to the top of the panel sections 50, and are provided with collapsible support braces 54 to ensure that the top panels 52 remain horizontal when the container is changed from the flat bed mode to the bulk mode or vice versa. When the unit is in the flat bed mode, both the floor panel sections 50 and the top panels 52 are flat. Struts 55 with hinges 56 are positioned inboard from the ends of the car 10 to support the floor panel sections 50 in the fully open position. A special unloading air bag 57 is provided at each end of the car 10, positioned under the floor panel sections 50. The air bag 57 is shown deflated in the left hand end to provide maximum storage space, and inflated in the right hand end thus allowing bulk material to flow to the discharge hopper. Top loading ports 58 are provided in the top panels 52. Thus this design of railroad car container utilizes all the space available in the car and ensures that the loading of the bulk material is spread evenly from one end of the car to the other.

The container may be loaded and unloaded by a number of different methods depending on the bulk material being conveyed, and the size of the unit. Built in recessed hatches may be provided at the top end of one or both floor panels as shown in FIG. 7. In the unit shown in FIG. 8, the hatches or ports may be in the top panel. Recessed fill pipe openings may be provided at one or both ends of the floor panel. In another embodiment recessed fill pipe openings on one or both sides of the container are connected to an internal built in hose which extends along the sidewall of the container to the approximate center where it connects to a hose extending along the container in both directions. This hose is open to the container at both ends and has openings along its length to allow material to be evenly distributed in the container. A pneumatic loading system, separate or built in can also be provided.

The liner 14 is preferably made from fabric materials. Non-woven fabrics, woven fabrics and plastic films are all suitable materials. The liner may be laminated from several different types of materials. Depending upon the type of bulk material, the liner should generally be water proof, impervious, resistant to wear and strong enough to avoid being damaged when it is folded to the collapsed position. A coating is generally put on the liner to ensure that it is water proof. The materials must be resistant to abrasion and wear and surface coatings may be applied both inside and outside the liner, the interior coatings serve to permit the transport of food or may provide a chemical resistant coating when certain chemicals are to be carried in the container. Exterior coatings can enhance the weatherability and permeability or abrasion resistance of the container.

In one embodiment, special properties are included in the exterior coating of the liner material. These properties magnetize the surface of the material causing it to stick in parts to the frame of the car or trailer, thereby, reducing or eliminating wear and tear caused by friction due to rubbing between the liner and the frame.

Figure 9:
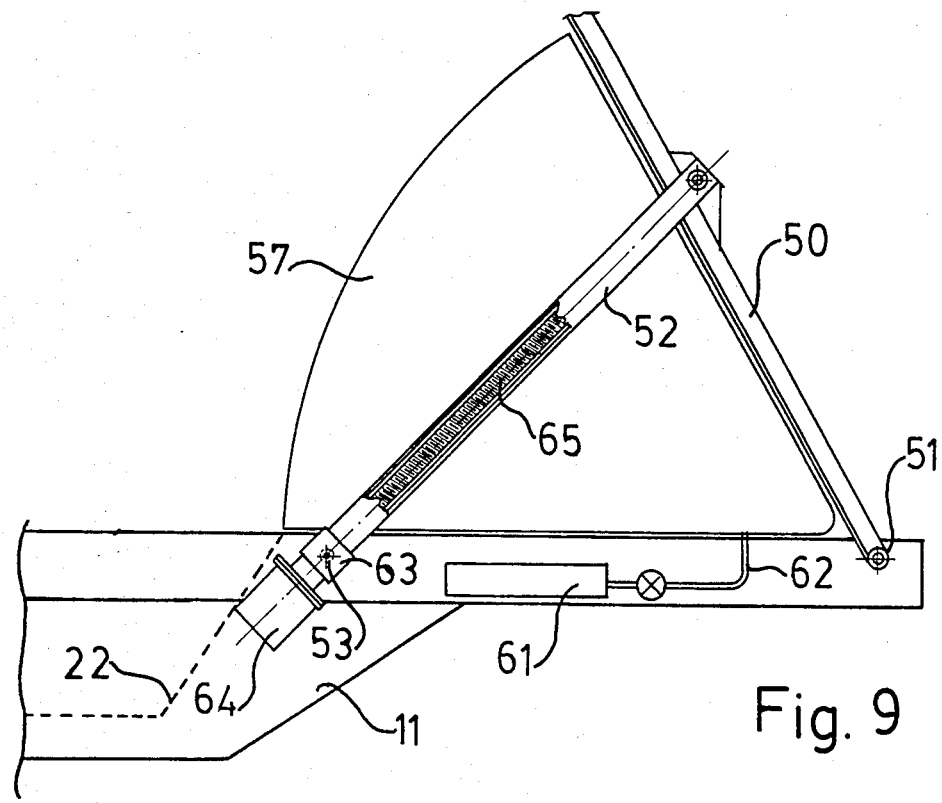

FIG. 9 illustrates an example of a detail of the end of the railroad car shown in FIG. 8. A special unloading air bag 57 is positioned beneath the floor panel section 50. A compressed air means 61 provides air through line 62 to the air bag so that when air is applied, the air bag provides a sloped surface that is substantially in line with the tapered sides 22 of the hopper compartment 13. This ensures that bulk materials flow to the discharge hopper.

The strut 52 illustrated in FIG. 9 has a load cell 63 at its lower end which senses either tension or compression in the strut 52. A motorized unit 64, such as an air motor, powers a longitudinal adjustment screw 65 within the strut 52 so the length of the strut 52 can be varied to maintain either tension or compression in the strut and ensure that there is even loading or pressure of the bulk material within the container. The tensioning and compression of the strut are preferably kept within desired limits as set by the load cell 64. This configuration may be used with the strut 20 shown in any of the figures.

Figure 10:
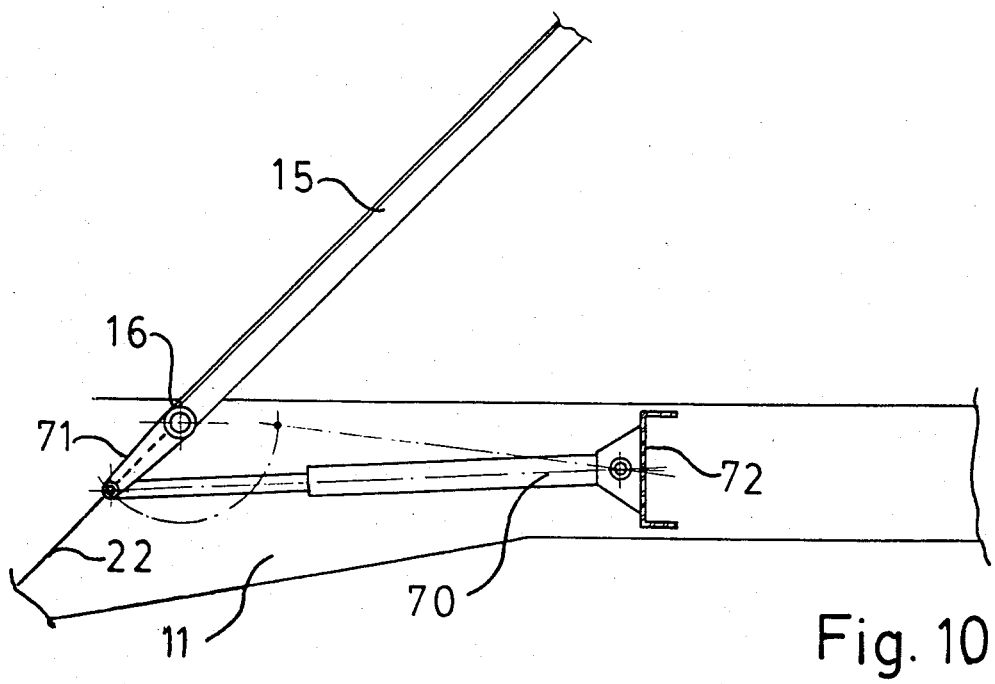
FIG. 10 is a detailed side view of a damper system for a floor panel section.

A damper system for a floor panel section 15 is illustrated in FIG. 10 comprising a cylinder 70 connected between an extension arm 71 of the panel section and a bracket 72 attached to the frame. FIG. 11 illustrates one embodiment for a join between the liner 14 and the panel section 15 or the main frame. A corrugated section 80 on the edge of the panel section has a mating strip 81 and wing nut 82 to hold the liner 14 firmly in position.

Various changes may be made to the embodiments described herein without departing from the scope of the present invention which is limited only by the following claims.

The embodiments of an invention in which an exclusive property or privilege is claimed are defined as follows:

1. A collapsible flexible bulk container for a wheeled flat vehicle comprising:

main frame with two laterally spaced longitudinal members, two floor panel sections, each hinged at outside edges to extremities of the main frame, the two panel sections having a closed position where the two panel sections are substantially flat on the main frame and an open position wherein the two panel sections slope upwards and inwards towards each other, flexible liner means attached to the two panel sections and the main frame, for providing a bulk container when the two panel sections are in the open position, strut support means positioned inwards one at each end of the main frame for supporting the two panel sections in the open position, and, discharge hopper means between the longitudinal members for emptying the bulk container.

2. The container as claimed in claim 1 when incorporated in a rail car.

3. The bulk container as claimed in claim 1 when incorporated in a road trailer.

4. The bulk container as claimed in claim 1 including inflatable air ribs incorporated with the flexible liner.

5. The bulk container as claimed in claim 4 wherein the air ribs are arranged within the flexible liner such that when they are inflated, the two floor panel sections move from the closed position to the open position.

6. The bulk container as claimed in claim 1 wherein the strut support means includes a sensing means to determine tension or compression in the strut support means.

7. The bulk container as claimed in claim 6 including a tensioning means incorporated with the strut support means which in cooperation with the sensing means moves the floor panel sections to keep the tension or compression in the strut support means within a predetermined range.

8. The bulk container as claimed in claim 1 wherein the shape of the liner when the two panel sections are in the open position is stabilized for tension and compression by stiffening members.

9. The container as claimed in claim 8 including support cables and stabilizing cables.

10. The container as claimed in claim 8 wherein the stiffening members comprise inflatable air ribs.

11. The container as claimed in claim 1 including at least one air bag inside and at each end of the flexible liner to fill up spare space in the container and prevent liquid slopping from one end to the other.

12. The container according to claim 11 wherein the air bag at each end is pressurized and including means to supply pressurized air to both bags to maintain at least one air bag taking up all free space within the container.

13. The container according to claim 1 including entry pipe connected to the container for pneumatic filling.

14. The bulk container as claimed in claim 1 including at least one air bag at each end of the main frame which when inflated provides a sloped surface to allow material in the ends of the container to be gravity discharged through the hopper means.

15. The bulk container as claimed in claim 1 wherein the flexible liner is formed from an impregnable fabric including an anti-friction coating to avoid wear when the liner rubs against the frame.

16. The bulk container as claimed in claim 1 wherein the flexible liner material has parts that are magnetized so that the liner holds to parts of the main frame to avoid wear from friction.

17. The bulk container as claimed in claim 1 wherein the hopper means comprises a plurality of parallel equispaced apart structural members, expandable hoses fitting in spaces between the structural members, and means to expand and deflate hoses to close and open the hopper means.

18. The bulk container as claimed in claim 1 including additional hoses positioned within the flexible liner to provide a fluid cleaning system within the container.

19. The bulk container as claimed in claim 1 including vacuum closing system wherein a vacuum is applied to the inside of the flexible liner to assist in folding the two panel sections from the open position to the closed position.

20. The bulk container as claimed in claim 1 wherein said strut support means include strut members and said bulk container further comprises means for mounting said strut members on said longitudinal members inboard of the floor panel sections so as to provide movement of the strut members between a first, support position and a second, closed position wherein the strut members lie flat on the main frame.

* * * * *